US005484638A

United States Patent [19]

Crabtree

[11] Patent Number: 5,484,638

[45] Date of Patent: Jan. 16, 1996

[54] TABLE TOP ADVERTISING DISPLAY

[76] Inventor: William M. Crabtree, P.O. Box 1013, Sedalia, Mo. 65301

[21] Appl. No.: 389,551

[22] Filed: Feb. 15, 1995

Related U.S. Application Data

[63] Continuation of Ser. No. 168,511, Dec. 16, 1993, abandoned, which is a continuation of Ser. No. 817,728, Jun. 17, 1992, abandoned.

[51] Int. Cl.[6] .......... B32B 3/00

[52] U.S. Cl. .......... 428/67; 428/76; 428/15; 428/195; 428/203; 428/204; 428/207; 428/913

[58] Field of Search .......... 428/41, 40, 528, 428/195, 15, 530, 535, 204, 913, 204, 203, 207, 67, 76

[56] References Cited

U.S. PATENT DOCUMENTS

| | | | |
|---|---|---|---|
| 2,180,002 | 11/1939 | Ford | 428/15 |
| 2,807,909 | 3/1954 | Schult | 45/131 |
| 3,062,604 | 10/1960 | Hodgen | 428/15 |
| 3,212,952 | 2/1962 | Turner | 108/161 |
| 3,610,175 | 10/1971 | Wilton | 108/161 |
| 3,920,870 | 11/1975 | Ackerman et al. | 428/346 |
| 4,278,483 | 7/1981 | Mansollilo | 428/215 |
| 4,484,745 | 11/1984 | Sleeper | 108/161 |
| 4,617,215 | 10/1986 | Telesco | 428/43 |
| 5,239,765 | 8/1993 | Opdahl | 40/603 |
| 5,258,235 | 11/1993 | Mehta et al. | 428/530 |

*Primary Examiner*—Patrick J. Ryan
*Assistant Examiner*—A. Bahta
*Attorney, Agent, or Firm*—Hovey, Williams, Timmons & Collins

[57] ABSTRACT

A table top advertising display (10) includes table top (12), indicia (14), and clear polymer coming (16). The indicia (14) may include screen printed ink, or adhesively mounted pictures arranged upon uppermost surface (18) of table (12).

1 Claim, 1 Drawing Sheet

TABLE TOP ADVERTISING DISPLAY

This application is a continuation of application Ser. No. 08/168,511 filed Dec. 16, 1993, now abandoned, which is a continuation of application Ser. No. 07/817,728, filed Jun. 17, 1992, now abandoned.

BACKGROUND OF THE INVENTION

1. Field of the Invention

The invention pertains to specialized table tops for incorporating advertising displays. The displays each include a table top having an uppermost surface, indicia attached to the surface, and a clear polymer protective coating.

2. Description of the Prior Art

Advertising displays are commonly utilized in commercial restaurants for the purpose of marketing various products. These displays may even generate revenue for the restaurant establishment if used to promote the products of another party.

At least two patents are directed towards placemat devices that may be used for advertising. Ackerman, U.S. Pat. No. 3,920,870, depicts a decorative placemat construction with a graphic pattern insert. Telesco, U.S. Pat. No. 4,617,215, depicts a paper placemat having a restaurant logo bounded at the sides by detachable coupons. The placemats are not durable in the sense that they are either disposable or only stay decent in appearance for about thirty to sixty days. Furthermore, the more durable placemats are difficult to clean and present sanitation problems.

A number of patents involve decorative table tops. Turner, U.S. Pat. No. 3,212,952, teaches a table top having coextensive glass panels for retaining thin plastic ornaments. Schult, U.S. Pat. No. 2,807,909, depicts a table having a series of rollers for passing an endless fabric design web over a table top. Hodgen, U.S. Pat. No. 3,062,604, depicts a polished table top formed of quartz and marble chips bonded together in a resin matrix. Sleeper, U.S. Pat. No. 4,484,745, discloses a table for the assembly of jigsaw puzzles wherein the table includes a flexible magnetic retaining sheet for holding the puzzle. Wilton, U.S. Pat. No. 3,610,175, depicts cast metal plaques for covering table tops, bars, and the like wherein the members have beveled edges for receiving waterproofing material.

In use as advertising displays, however, these decorative table tops present many problems to the restaurant establishment. These problems at the very least include high cost and sanitation problems.

Other restaurant advertising displays include bulletin boards, flip clocks, and reader boards. However, these devices fail to present advertisements to potential customers for a time sufficient to provide a high level of advertising absorption to the customers. Bulletin boards are stationary, fairly non-interactive, and easily ignored. Flip clocks are mechanical devices that display a sequence of advertisements, with each of ten to fifteen sequential advertisements typically being displayed for only about two to three seconds. Reader boards are typically mounted upon a restaurant wall, and a customer would most often have to watch a given board for five or six consecutive minutes in order to read all of the advertisements.

SUMMARY OF THE INVENTION

The invention overcomes the problems that are outlined above by providing a high-quality, long-lasting, and inexpensive display for providing high absorption advertising. The display includes a table top having an uppermost surface, indicia attached to the surface, and a clear polymer protective coating. These displays may be utilized to particular advantage in restaurants, where the customer will often have 15 to 30 minutes or more to peruse the advertisements while interacting with a meal and the table.

DESCRIPTION OF THE PREFERRED EMBODIMENT

Figure 1:
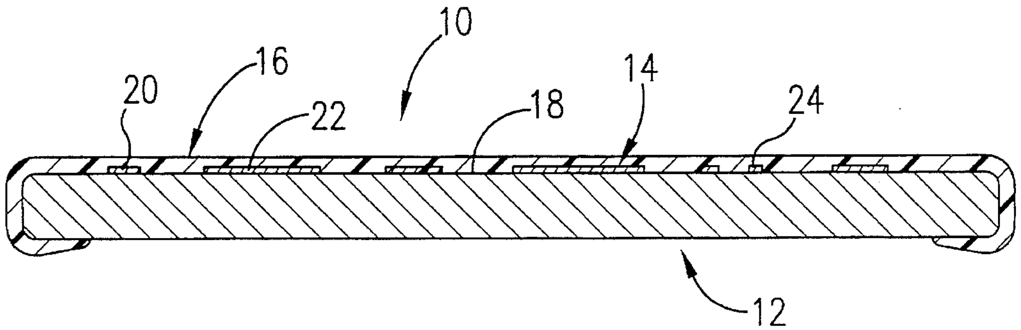
FIG. 1 depicts a sectional side view of a table top display of the invention, including the table top, indicia, and protective coating.

FIG. 1 depicts display 10 having table top 12, indicia 14, and clear protective coating 16.

Table top 12 is a conventional restaurant table top, which may be attached to conventional supportive legs. Table top 12 presents flat uppermost surface 18, and may be made of metal, plastic, glass, wood, fiberglass, formica, or other similar materials.

Indicia 14 include a plurality of advertisements, e.g. 20, 22, and 24. These advertisements may be screen printed directly onto surface 18 with enamel ink according to conventional screen printing methods. Alternatively, the advertisement may be pictures, such as photographs or printed matter, and may be glued to surface 18 with any compatible glue. Additionally, the pictures may be coated with glue on their top surfaces, in order that the glue may act as a sealant.

Figure 2:
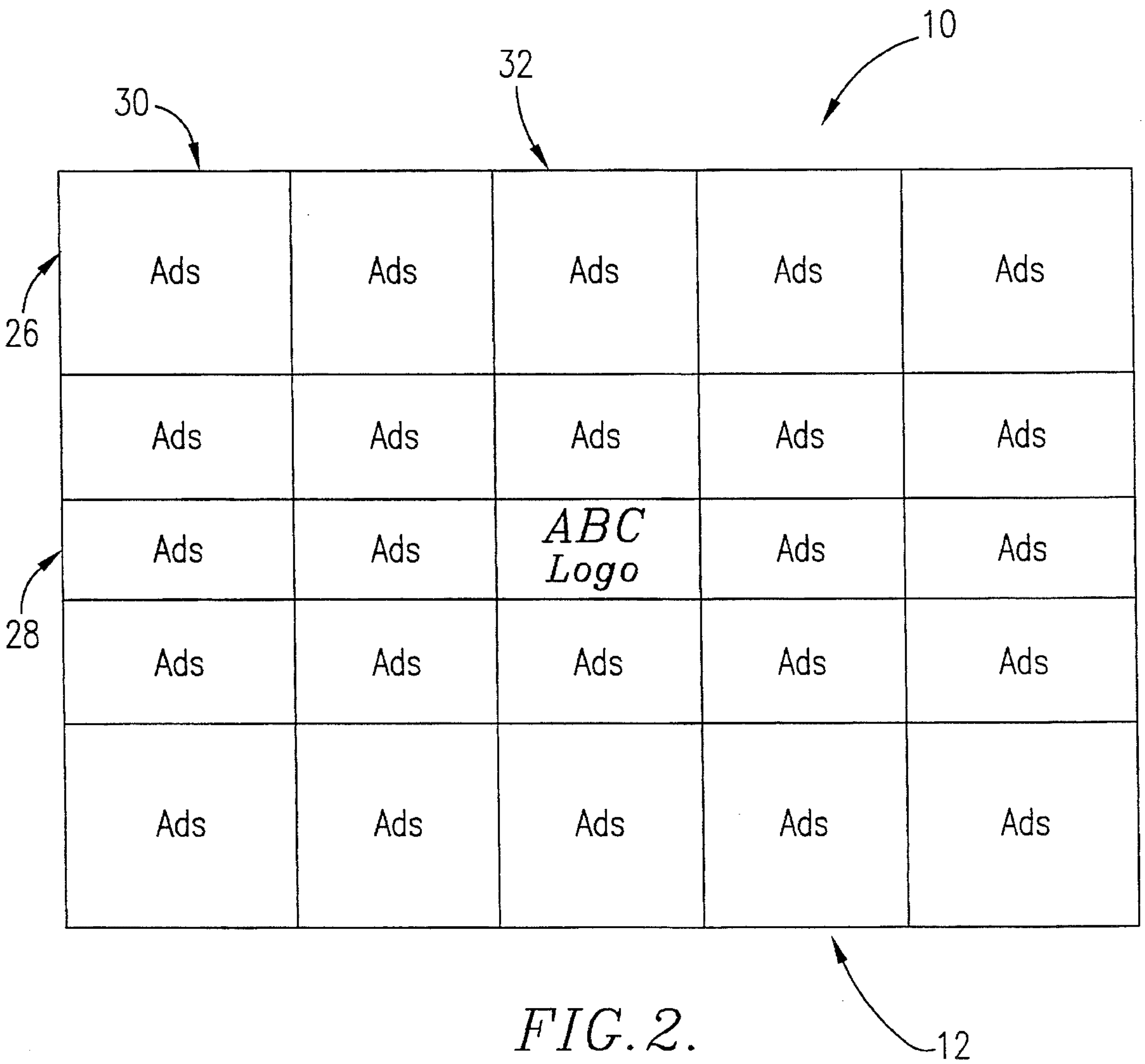
FIG. 2 is a schematic top view of the FIG. 1 display.

FIG. 2 schematically depicts the most preferred manner of arranging the indica for the display, including a row and column layout of differing vertical, not lateral, dimensions; e.g., rows 26 and 28, as well as columns 30 and 32.

Protective coating 16 is preferably a clear epoxy or other synthetic coating. Coating 16 covers both indicia 14 and the exposed portions of uppermost surface 18.

In use, the table top advertising display is positioned in a restaurant for use by a restaurant customer. The customer brings a meal to the table and sits down to consume the meal. Over the ensuing fifteen to thirty minutes, the typical customer will actively peruse the advertising materials, thereby receiving a high level of advertising absorption. Food spills may be easily removed from the epoxy coating with a damp cloth, and such spills will not seep through to soil the protected advertisements underlying the coating.

Those skilled in the art will understand that obvious modifications may be made to the preferred embodiments as hereinabove described, without departing from the scope and spirit of the invention. Accordingly, the inventor hereby states his intention to rely upon the Doctrine of Equivalents in order to protect his full rights in the invention.

I claim:

1. An advertising display consisting essentially of:

a table top having an uppermost wooden surface, an opposed lowermost surface, and side margins connecting said uppermost and lowermost surfaces, said table top presenting a thickness;

indicia permanently printed directly onto said uppermost wooden surface;

a clear sealant coating applied over said indicia for sealing said indicia; and a clear protective epoxy coating applied over said sealant coating, said indicia and said uppermost wooden surface, said clear protective epoxy coating forming a smooth finish over said table top uppermost wooden surface, said clear protective epoxy coating being applied so that it entirely envelops said table top uppermost wooden surface and side margins and wraps around a portion of said table top lowermost surface, Said clear protective epoxy coating presenting a thickness less than the thickness of said table top.

* * * * *

Disclaimer 5,484,638 - William M. Crabtree, Sedalia, Mo. TABLE TOP ADVERTISING DISPLAY, Patent dated Jan. 16, 1996. Disclaimer filed Mar. 25, 2009, by the Patentee.

Hereby enters this disclaimer to claim 1 of said patent.

*(Official Gazette, April 28, 2009)*